H. SPIEKER.
POTATO PLANTER.
APPLICATION FILED SEPT. 2, 1911.
1,035,255.
Patented Aug. 13, 1912.
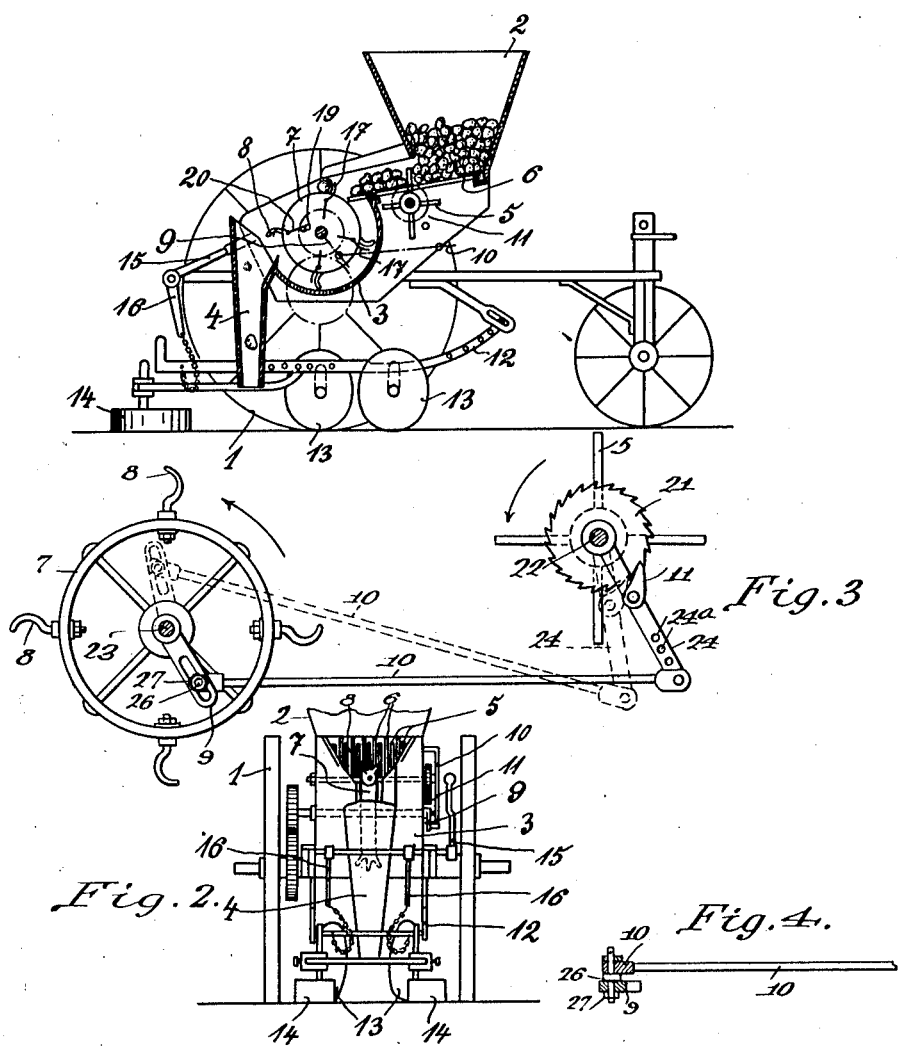

UNITED STATES PATENT OFFICE.

HEINRICH SPIEKER, OF STRIELAU, KR. PLESCHEN, GERMANY.

POTATO-PLANTER.

1,035,255.  Specification of Letters Patent.  Patented Aug. 13, 1912.

Application filed September 2, 1911. Serial No. 647,365.

*To all whom it may concern:*

Be it known that I, HEINRICH SPIEKER, a subject of the Emperor of Germany, residing at Strielau, Kr. Pleschen, Prussia, Germany, farmer, have invented new and useful Improvements in Potato-Planters, of which the following is a specification.

It is known in potato planters that to arrange an intermittently operating feeding device between the potato container and the discharge wheel or distributing wheel is old. The feeding device usually consists of a grooved wheel or an elevator provided with shelves which is moved past the potato store and delivers the potatoes which have dropped into the grooves or shelves to the discharging or distributing wheel. This arrangement has the disadvantage that the potatoes prevent each other from dropping into the feeding compartments, grooves, or shelves whereby the operation of the machine is frequently irregular.

The present invention has for its object to obviate this drawback. The improvement consists mainly in providing an intermediate feeding device which consists of prong shaped feeders which work from below through a grating and separate at regular intervals equal volumes of potatoes from the potato store lying on the grating. An interruption of the feed is impossible since the potatoes lie always within the reach of the feeders and are merely shoved by the feeders to the distributing wheel. The intermittent movement of the feeders may be varied independently of the speed of the distributing wheel in order to provide regulation in accordance with the size of the potatoes whereby small numbers of potatoes may be fed at comparatively short intervals or larger numbers at longer intervals, as desired.

The accompanying drawings illustrate a constructional form of the invention, Figure 1 being an elevation of the planter, partly in section, and Fig. 2 a rear view of the same. Fig. 3 is a detail side elevation of the intermittent feeding mechanism. Fig. 4 is a detail sectional view showing the connection between the connecting rod and the crank.

The hopper 2 receiving the potato store, is arranged between the large driving wheel 1, 1 and is continued below in the casing 3 which incloses the distributer. The apparatus for delivering the potatoes from the hopper 2 to the discharge chute 4 and at the same time dividing the delivered quantities so that they are singly discharged from the chute, consists of the intermediate feeding device or counter 5 and the distributing wheel 7 which discharges the potatoes into the discharge tube. The intermediate device or counter 5 is constituted by a drum rotating about a horizontal axis and provided with four rows of prongs which work from below through a grating 6 extending from the bottom of the hopper to the casing 3. The distributing wheel 7 is arranged close to the end of the grating and possesses four lifters 8, each of which has three prongs. The distributing wheel is driven by means of toothed gearing from the axle of the driving wheels 1, 1. Upon the shaft of the distributing wheel 7 is fixed a crank 9, and adjustably connected thereto by means of a screw 26 and nut 27, is a rod 10 which is pivotally connected to a lever 24 loosely mounted upon the shaft 22 of the counter 5, by means of a pin which passes through one of a series of openings 24ᵃ in the lever 24 and openings in the end of the rod 10. A spring actuated pawl 11 pivotally connected to the lever 24 engages with a ratchet wheel 21 fixed on the shaft of the counter 5 and, at each revolution of the distributing wheel, turns the counter 5 through a pre-determined angle. By each movement of the counter 5 the potatoes lying on the grating in front of the prongs are shoved a certain distance toward the distributing wheel while at the same time the potatoes lying behind the prongs are retained. The potatoes are thus gradually shoved forward and brought within the reach of the lifters 8 of the distributing wheel 7 the speed of which is so calculated with regard to the speed of the drum 5 that only one potato is lifted at a time and afterward thrown into the discharge tube 4. The planting furrow is opened by two disks 13, 13 mounted upon a swinging frame 12 suspended from brackets of the main frame. The disks are both placed inwardly aslant so as to throw the soil outward to both sides of the furrow formed. The furrow is closed after the potatoes have been dropped, by shares 14, 14 so that the planted potatoes are covered with soil. The frame or frames carrying the furrow disks may be raised in case of need by means of a hand lever 15 actuating levers 16, 16 connected to the frame or frames by chains.

By suitably changing the gear wheels, the crank and other parts, the distances at which the potatoes are planted may be varied, while the distance between the furrows may be varied by spreading the drive wheels on the axle.

Jamming of the potatoes in the lifters 8 is prevented by ejectors 17 which are constituted by double armed levers placed upon the wheel close to the grippers. The inner ends 20 of these ejectors which are preferably made of springy material strike against a fixed stop 19 and cause the outer ends to enter between the prongs of the grippers and to eject the potatoes.

I claim:

1. A potato planter comprising in combination a hopper, a distributer, a grating leading from the exit of said hopper to said distributer, movable fingers adapted to pass through the spaces of said grating and to feed potatoes along the latter, and driving means for intermittently moving said fingers.

2. A potato planter comprising in combination a hopper, a rotary distributer, a grating leading from the exit of said hopper to said distributer, rotary tines adapted to pass through the spaces in said grating to feed potatoes along the latter to said distributer, driving means adapted to drive said distributer at a predetermined speed, and ratchet mechanism for intermittently driving said rotary tines.

3. A potato planter comprising in combination a hopper, a rotary distributer, a grating leading from the end of said hopper to said distributer, rotary tines adapted to pass through the spaces in said grating to feed potatoes along the latter to said distributer, driving means comprising gears adapted to drive said distributer at a predetermined speed, and ratchet mechanism for intermittently driving said rotary tines.

4. A potato planter comprising in combination a hopper, a rotary distributer, ground wheels, gear between said ground wheels and said distributer, a grating leading from the exit of said hopper to said distributer, rotary tines adapted to pass through spaces in said grating to feed potatoes along the latter to said distributer, and step by step gear between said distributer and said rotary tines for intermittently actuating said rotary tines substantially as set forth.

5. A potato planter having a frame, supporting wheels journaled on said frame, a rotary distributer journaled on the frame, gearing between the supporting wheels and distributer arranged to rotate said distributer, a feeding device rotatably mounted in the frame, a ratchet wheel connected to the shaft of the feeding device, a crank connected to the shaft of the distributer, pawl mechanism for actuating the ratchet connected to the feeding device, and actuating mechanism connected between the pawl and the crank on the distributer for intermittently actuating the feeding device; substantially as described.

In testimony whereof I have signed my name to this specification in the presence of two subscribing witnesses.

HEINRICH SPIEKER.

Witnesses:
SAM WATTS,
ERNST BLEISCH.